United States Patent [19]
Kearney et al.

[11] 3,970,385
[45] July 20, 1976

[54] MICROFILM RECORDER DOCUMENT TRANSPORT SYSTEM

[75] Inventors: Robert L. Kearney, Northbrook; Eugene Sather, Deerfield, both of Ill.

[73] Assignee: Bell & Howell Company, Chicago, Ill.

[22] Filed: Nov. 15, 1974

[21] Appl. No.: 524,300

[52] U.S. Cl................................ 355/50; 271/195; 352/222; 355/64; 355/75
[51] Int. Cl.².................. G03B 27/48; G03B 27/50; B65H 29/24
[58] Field of Search.............. 355/64, 23, 24, 47–49, 355/50, 51, 75; 352/222; 226/168, 91; 271/195, 64

[56] References Cited
UNITED STATES PATENTS

| | | | |
|---|---|---|---|
| 2,278,518 | 4/1942 | Kenney et al. | 271/64 |
| 3,382,763 | 5/1968 | Bruning | 271/195 X |
| 3,597,076 | 8/1971 | Hubbard et al. | 355/49 X |

Primary Examiner—Richard A. Wintercorn
Attorney, Agent, or Firm—Robert A. Walsh

[57] ABSTRACT

A microfilm recording machine of the type which makes a photographic reproduction of each document processed therethrough has an improved document transport system for presenting the documents in a predetermined focal plane within the machine document scanning zone. The transport system includes a single glass plate having a longitudinal major surface within the predetermined focal plane and a transverse axis forward of the major surface. A pair of cooperating transport rollers on each side of the glass plate form nips for engaging the documents. The nips are forward of the glass plate major surface and the rollers are rotatable about axes to transport each document through the scanning zone. The plane embracing the axes of rotation of each respective roller pair converges upon the transverse axis so that each document is directed toward and against the major surface as it is transported through the scanning zone. A fan for providing a column of air flow aimed at the major surface holds each document flat against the glass plate major surface.

8 Claims, 1 Drawing Figure

U.S. Patent   July 20, 1976   3,970,385
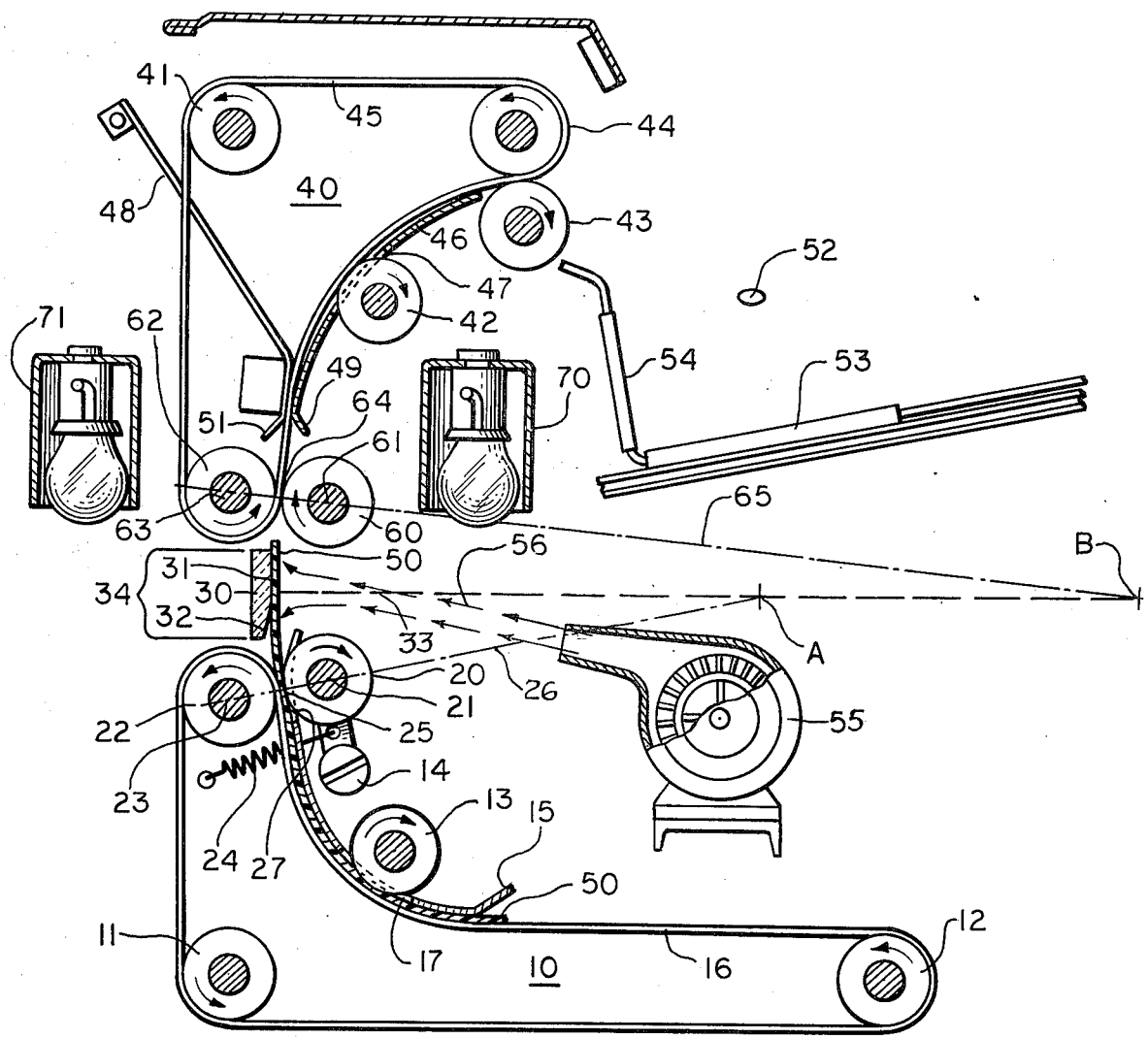

MICROFILM RECORDER DOCUMENT TRANSPORT SYSTEM

BACKGROUND OF THE INVENTION

The present invention is directed generally to microfilm recording machines and in particular to an improved transport mechanism for transporting documents through the scanning zone of rotary microfilm recording machines.

Rotary microfilm recording machines are well known. They find various applications, one appplication for example being in the banking environment for use in processing checks. During the processing of the checks, each check is photographed on both sides simultaneously onto a reel of microfilm which is then immediately processed or processed when a question concerning an individual check is encountered.

Such microfilm recording machines usually include a document input feed mechanism wherein the documents are fed into the machine, and a document exit where the documents are expelled and stacked. In between the document input feed mechanism and exit is a scanning zone wherein the checks are presented to a scanning photographic camera and associated mirrors to enable the camera to make a photographic reproduction of both sides of the check simultaneously. Inasmuch as the checks are fed into the machine at a relatively high rate, each check must be presented to the scanning zone in a controlled and efficient manner so that the checks do not become wedged or othewise jammed in the machine and additionally, so that each check is presented to the scanning zone within a focal plane of the camera to achieve high resolution.

For presenting the checks into the scanning zone, two basic types of transport systems have been utilized in the prior art. The first type of transport system includes a gap in between a pair of transport rollers, the gap providing unobstructed view of the check within the scanning zone. The second type of transport system is a two-glass flat document system wherein a pair of glass plates are interposed between a pair of transport rollers to provide a channel in which each check is transported through the scanning zone.

Transport systems of the first variety are generally deficient in maintaining adequate focal plane control of the documents, particularly on the leading and trailing edges. As a result, poorly focused images as well as image distortion is caused by the whip or flip of the document passing through the scanning zone area. The open gap arrangement is also deficient in controlling the flow of documents through the photographic area resulting in escessive document jamming and throw-out of the documents through the gap opening.

The transport systems of the second variety are also dificient in use because the glass plates must be spaced sufficiently apart to accomodate thicker or partially mutilated documents. As a result effective confinement of the comparatively thin documents in an optimum focal plane is impossible. This obviously results in poorly focused images as well as distorted images due to whip or flip of the documents in the scanning zone area. In addition, thick or partially mutilated documents can wedge between the pair of glass plates causing severe paper jams in the recording machine. Lastly, such systems display an inherent difficulty in keeping the glass plate photographically clean. Along this line, because there are four glass surfaces involved, normal atmospheric dust, smoke and haze tend to form on the surfaces of the glass plates tending to excessively deteriorate the photographic quality unless the glass plates are carefully and regularly cleaned by an operator.

It is an object of the present invention to provide an improved transport system for a microfilm recording machine which presents each document to the machine scanning zone within a predetermined focal plane.

It is a still further object of the present invention to provide a transport system for a microfilm recording machine which maintains positive control of the documents as they are transported through the machine scanning zone to avoid document mutilation and machine jamming.

The present invention provides a microfilm recording machine an improved document transport system for presenting each document in a predetermined focal plane within the scanning zone. The transport system comprises a glass plate within the scanning zone having a longitudinal major surface portion lying substantially with the predetermined focal plane and having a transverse axis extending forward from the longitudinal major surface. The transport system of the present invention additionally includes a pair of cooperating transport rollers between the glass plate and the document input feed mechanism rotatable about axes to transport a document from the input feed mechanism into the scanning zone, the rollers forming a nip to engage each document, the nip being forward of the major surface and the plane embracing the axes of rotation converging upon the transverse axis. As a result, each document transported through the nip of the transport rollers is directed toward and against the longitudinal major surface of the glass plate as it is transported through the scanning zone to assure that each document is presented to the scanning zone substantially within the predetermined focal plane.

BRIEF DESCRIPTION OF THE DRAWING

The features of the present invention which are believed to be novel are set forth with particularity in the appended claims. The invention, together with further objects and advantages thereof, may best be understood by reference to the following description taken in conjunction with the accompanying drawing, in which the single FIGURE is a partial side view in schematic form of a microfilm recording machine embodying the present invention.

DESCRIPTION OF THE PREFERRED EMBODIMENT

The single FIGURE in the drawing shows a partial side view in schematic form of a microfilm recording machine embodying the present invention. For further details as to the construction and overall operation of such a microfilm recording machine, reference may be made to U.S. Pat. No. 3,342,100 which issued Sept. 19, 1967 and which is assigned to the assignee of the present invention.

The microfilm recording machine comprises a document input feed mechanism 10, a document exit 40 and a scanning zone 34. The microfilm recording machine additionally comprises a transport system including a first pair of cooperating transport rollers 20, 22, a second pair of cooperating transport rollers 60, 62 and a glass plate 30 positioned in between the first and second pair of transport rollers within the scanning zone.

The machine also includes a plurality of lights 70, 71 and a fan 55 whose function will be described later.

Input feed mechanism 10 includes a plurality of drive rollers 11, 12 and 13, an endless belt 16 and a guide plate 14. Belt 16 is looped about drive rollers 11, 12 and transport roller 22 as shown. Each drive roller is adapted to rotate in the direction of its associated arrow. Guide 14 has a flange 15 which presents a relatively wide opening to a document inserted between guide 14 and belt 16. Guide 14 is grandually curved to feed a document from a substantially horizontal position to a substantially vertical position by the time it reaches transport rollers 20 and 22. Drive roller 13 is received through an opening 17 in guide 14 and contacts belt 16 to drivingly engage a document placed onto the belt.

Document exit 40 comprises a plurality of drive rollers 41, 42, 43 and 44, belt 45, guide plate 46, guide bracket 48 and hopper 52.

Belt 45 is an endless belt and embraces drive rollers 41 and 44 and transport roller 62 as shown. All of the rollers are rotatable in the direction of the arrows to transport a document from the scanning zone 34 to the hopper 52. Guide plate 46 is curved and forms a channel to guide each document into the hopper 52. Guide plate 46 has a flange 49 and guide bracket 48 has flange 51 forming an enlarged opening for receiving the document to be exited from the machine. Drive roller 42 extends through opening 47 within guide plate 46 and contacts the belt 45 to drivingly engage the documents to assist in feeding them to the hopper.

The hopper 52 includes a platform 53 where the documents exited from the machine are stacked. Side wall 54 extends up adjacent to roller 43 to assure that none of the documents are inadvertently given entrance to the machine while they are exited.

In between document feed mechanism 10 and document exit 40 is a transport system including glass plate 30 within scanning zone 34 wherein the documents are photographed on both sides simultaneously. As well known, when a document enters the scanning zone it is illuminated by lights 70 and 71 on each side and is scanned by a camera on both sides through the co-action of a plurality of mirrors to provide a reproduction of microfilm of both sides of each document fed through the machine. For reasons of brevity the camera and associated mirrors are not shown in the drawing but are shown and fully described in the aforementioned U.S. Pat. No. 3,342,100.

The document transport system comprises a first pair of cooperating transport rollers 20 and 22, a glass plate 30 and a second pair of co-acting transport rollers 60 and 62. Glass plate 30 has a major longitudinal surface portion 31 lying substantially within the predetermined focal plane of the machine and a transverse axis 33 extending forward from the longitudinal major surface 31. Glass plate 30 additionally includes a minor surface portion 32 adjacent to the first pair of transport rollers 20 and 22 and also integral with and inclined relative to the major surface portion 31 as shown.

Transport rollers 20 and 22 are positioned between glass plate 30 and the document feed mechanism 10 and are rotatable about axes 21 and 23 to transport a document from input feed mechanism 10 into the scanning zone 13. Roller 20 is biased against a belt 16 by spring 24 and contacts the belt through opening 25. Rollers 20 and 22 form a nip 27 for engaging each document and are positioned such that nip 27 is forward of glass plate major surface 31. Additionally, the plane 26 which embraces the axes of rotation 21 and 23 converges upon and intersects the transverse axis 33 at A. As a result of this arrangement, the leading edge of the document 50 transported through transporting rollers 20 and 22 is directed toward and against longitudinal major surface 31 of glass plate 30 to be transported through the scanning zone 34 substantially within the predetermined focal plane of the machine. Obviously, each portion of the document 50 is directed to and against the longitudinal major surface 31 as the document is transported through the scaning zone 34.

The second pair of transport rollers 60 and 62 are similarly arranged and rotatable about axes of rotation 61 and 63. Rollers 60 and 62 which cooperate to form a nip 64 to engage each document as it leaves the scanning zone 34 are positioned such that nip 64 is forward of the major surface 31. Additionally, the plane 65 which embraces the axes of rotation 61 and 63 also converges upon transverse axis 33 and intersects it at B. With this arrangement each document is continually urged against major surface 31 and additionally, the trailing edge of each document is directed towards and urged against major surface 31 as the document leaves scanning zone 34 to be exited and stacked in hopper 52.

Fan 55 generates a column of air flow 56 which is directed toward major surface 31 of glass plate 30. The air flow generated by fan 55 assists in holding each document flat against major surface 31 as it is being scanned by the photographic camera. Inasmuch as nips 27 and 64 are forward of the major surface 31, the air flow impinges the document and holds it against the major surface. Preferably, the width of the air column 56 should approximate the width of the major surface 31 to assure that the entire width of document 50 is impinged by the air flow.

Minor surface portion 32 is provided to assure that the leading edges of each document fed through the scanning zone 34 assumes the proper position against major surface 31. By being adjacent to transport rollers 20 and 22, the leading edge of each document is first received by minor surface portion 32 and is gradually conveyed to the major surface 31.

In operation, a document 50 fed in between guide bar 14 and belt 16 is conveyed to transport rollers 20 and 22 where the nip 27 engages the document. The document is then directed towards and urged against major surface 31 after contacting minor surface 32 and is continuously held against the major surface 31 by the air flow 56 provided by fan 55. As the leading edge is engaged by nip 64 of rollers 60 and 62, the document is continued to be transported through the scanning zone. When the trailing edge of the document is released from nip 27 it is still continuously directed against major surface 31 by the relative positioning of rollers 60 and 62. After the trailing edge passes through scanning zone 34 it is conveyed by belt 45 and guide 46 to hopper 52 where it is stacked onto platform 53.

As can be seen from the FIGURE, plane 26 converges upon transverse axis 33 at a faster rate than does plane 65. Thus the leading edge of document 50 is more directly aimed toward major surface 31 than when it leaves surface 31. This arrangement is advantageous to assure that the leading edge will engage nip 64 when leaving scanning zone 34.

The present invention provides an improved document transport system for a microfilm recording machine. The transport rollers are positioned to direct each document towards and against the glass plate major surface within the predetermined focal plane to assure that each document is presented to the scanning zone within the predetermined focal plane of the machine. Additionally, the positioning of the transport rollers assures that the trailing edge of each document is also held against the major surface within the focal plane to preclude document flip and to assure that high resolution will be achieved for the entire document. The air flow provided by the fan also assists in holding each document against the major surface of the glass plate within the predetermined focal plane. Because only one glass plate is necessary, it can be placed in the machine for ready access for cleaning. Additionally, because only one glass plate is used there is less likelihood of jamming regardless of the thickness or condition of the documents fed into the machine. Lastly, and also due to the relative positioning of the transport rollers and the glass plate, each document fed through the machine is under positive control at all times which reduces the possibility that a document may be inadvertently flipped out of the scanning zone while passing therethrough.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. In a microfilm recording machine of the type which makes a photographic reproduction of documents processed therethrough and which includes a document input feed mechanism, a document exit and a scanning zone between the input feed mechanism and exit wherein each document is scanned and photographed, an improved document transport system for presenting each document in a predetermined focal plane within the scanning zone, said transport system comprising:
   a transparent plate within the scanning zone having a longitudinal major surface portion lying substantially within the predetermined focal plane and having a transverse axis extending forward from said longitudinal major surface; and
   a first pair of cooperating transport rollers between said plate and the document input feed mechanism rotatable about first axes of rotation to transport a document from the input feed mechanism into the scanning zone, said rollers forming a first nip to engage each document, said first nip being forward of said major surface and the plane embracing said axes of rotation converging upon said transverse axis; whereby,
   each document transported through the first nip of said transport rollers is directed toward and against said longitudinal major surface of said plate as it is transported through the scanning zone to assure that each document is presented to the scanning zone substantially within the predetermined focal plane.

2. A transport system in accordance with claim 1 wherein said plate further comprises a minor surface portion adjacent said transport rollers and integral with and inclined relative to said major surface portion to thereby assist in directing each document against said major surface portion.

3. In a microfilm recording machine of the type which makes a photographic reproduction of documents processed therethrough and which includes a document input feed mechanism, a document exit and a scanning zone between the input feed mechanism and exit wherein each document is scanned and photographed, an improved document transport system for presenting each document in a predetermined focal plane within the scanning zone, said transport system comprising:
   a transparent plate within the scanning zone having a longitudinal major surface portion lying substantially within the predetermined focal plane and having a transverse axis extending forward from said longitudinal major surface;
   a first pair of cooperating transport rollers between said plate and the document input feed mechanism rotatable about first axes of rotation to transport a document from the input feed mechanism into the scanning zone, said rollers forming a first nip to engage each document, said first nip being forward of said major surface and the plane embracing said axes of rotation converging upon said transverse axis; and
   air flow generating means positioned forward of said nip and directed toward said major surface for providing a flow of air to impinge each document as it passes through the scanning zone; whereby
   each document transported through the first nip of said transport rollers is directed toward and against said longitudinal major surface of said plate as it is transported through the scanning zone to assure that each document is presented to the scanning zone substantially within the predetermined focal plane, and said air flow generating means holds each document against said major surface portion within the predetermined focal plane irrespective of document thickness.

4. In a microfilm recording machine of the type which makes a photographic reproduciton of documents processed therethrough and which incudes a document input feed mechanism, a document exit and a scanning zone between the input feed mechanism and exit wherein each document is scanned and photographed, an improved document transport system for presenting each document in a predetermined focal plane within the scanning zone, said transport system comprising:
   a transparent plate within the scanning zone having a longitudinal major surface portion lying substantially within the predetermined focal plane and having a transverse axis extending forward from said longitudinal major surface;
   a first pair of cooperating transport rollers between said plate and the document input feed mechanism rotatable about first axes of rotation to transport a document from the input feed mechanism into the scanning zone, said rollers forming a first nip to engage each document, said first nip being forward of said major surface and the plane embracing said axes of rotation converging upon said transverse axis; and
   a second pair of cooperating transport rollers between said plate and the document exit, rotatable about second axes of rotation to transport a document from the scanning zone to the document exit, said second rollers forming a second nip to engage each document, said second nip being forward of said major surface and the plane embracing said second axes of rotation converging upon said transverse axis; whereby, each document transported through the first nip of said transport rollers is directed toward and against said longitudinal major surface of said plate and is received by said second nip of said second transport rollers to continue its direction toward and against said longitudinal major surface as it is transported through the scanning zone to assure that each document is presented to the scanning zone substantially within the predetermined focal plane.

5. A transport system in accordance with claim 4 further comprising air flow generating means positioned forward of said nip and directed toward said major surface for providing a flow of air to impinge each document as it passes through the scanning zone, whereby each document is held against said major surface portion within the predetermined focal plane irrespective of document thickness.

6. A transport system in accordance with claim 4 wherein said plane embracing said first axes of rotation converges upon said transverse axis at a faster rate than said plane embracing said second axes of rotation.

7. In a microfilm recording machine of the type which makes a photographic reproduction of documents processed therethrough and which includes a document input feed mechanism, a document exit and a scanning zone between the input feed mechanism and exit wherein each document is scanned and photographed, an improved document transport system for presenting each document in a predetermined focal plane within the scanning zone, said transport system comprising:

a transparent plate within the scanning zone having a longitudinal major surface portion lying substantially within the predetermined focal plane;

a first pair of cooperating transport rollers between the document input feed mechanism and said plate, rotatable to transport a document from the input feed mechanism into the scanning zone, said first rollers forming a first nip to engage each document;

a second pair of cooperating transport rollers between said plate and the document exit, rotatable to transport a document from the scanning zone to the document exit, said second transport rollers forming a second nip to engage each document;

said first and second nips being forward of said major surface portion for presenting each document in front of said major surface portion; and air flow generating means positioned forward of said nips and directed towards said major surface for providing a flow of air to impinge each document as it passes through the scanning zone to hold each document up against said major surface portion; whereby, each document transported through the scanning zone between said first and second nips is held against said plate major surface portion by said flow of air to assure that each document is presented to the scanning zone substantially within the predetermined focal plane irrespective of document thickness.

8. In a microfilm recording machine of the type which makes a photographic reproduction of documents processed therethrough and which includes a document input feed mechanism, a document exit and a scanning zone between the input feed mechanism and exit therein each document is scanned and photographed, an improved document transport system for presenting each document in a predetermined focal plane within the scanning zone, said transport system comprising:

a glass plate within the scanning zone having a longitudinal major surface portion lying substantially within the predetermined focal plane and; a minor surface; portion adjacent said first pair of transport rollers and integral with and inclined relative to said major surface portion a first pair of cooperating transport rollers between the document input feed mechanism and said plate, rotatable to transport a document from the input feed mechanism into the scanning zone, said first rollers forming a first nip to engage each document;

a second pair of cooperating transport rollers between said glass plate and the document exit, rotatable to transport a document from the scanning zone to the document exit, said second transport rollers forming a second nip to engage each document;

said first and second nips being forward of said major surface portion for presenting each document in front of said major surface portion; and air flow generating means positioned forward of said nips and directed towards said major surface for providing a flow of air to impinge each document as it passes through the scanning zone to hold each document up against said major surface portion; whereby, each document transported through the scanning zone between said first and second nips is held against said plate major surface portion by said flow of air to assure that each document is presented to the scanning zone substantially within the predetermined focal plane irrespective of document thickness.

* * * * *